United States Patent [19]
Fiske et al.

[11] Patent Number: 5,810,276
[45] Date of Patent: Sep. 22, 1998

[54] TURBINE HEAD ASSEMBLY WITH INLET VALVE DRIVEN BY A FORWARD POSITIONED ACTUATION ASSEMBLY

[76] Inventors: Erik A. Fiske, 10539 Fernglen Ave., Tujunga, Calif. 91042; Earl W. Presson, 4900 Pimlico Cir., Brownsboro, Ala. 35741

[21] Appl. No.: 980,954

[22] Filed: Nov. 24, 1992

[51] Int. Cl.$^6$ ............................ B65H 75/48; B64C 00/00
[52] U.S. Cl. ...................................... 242/390.5; 244/1 TD
[58] Field of Search ............................ 242/390.5, 390.6; 244/1 TD, 135 A

[56] References Cited

U.S. PATENT DOCUMENTS

| | | | |
|---|---|---|---|
| 3,699,771 | 10/1972 | Chelminski | 60/39.35 |
| 3,752,418 | 8/1973 | Rosta | 244/23 C |
| 3,774,864 | 11/1973 | Hurkamp | 244/13 |
| 4,007,892 | 2/1977 | Tabor | 244/62 |
| 4,193,262 | 3/1980 | Snell | 60/261 |
| 4,364,366 | 12/1982 | Terwilliger | 123/564 |
| 4,392,472 | 7/1983 | Merritt et al. | 123/564 |
| 4,393,852 | 7/1983 | Merritt et al. | 123/564 |
| 4,424,781 | 1/1984 | Speer et al. | 123/342 |
| 4,496,159 | 1/1985 | Dugan et al. | 273/341 |
| 4,770,368 | 9/1988 | Yates et al. | 244/1 TD |
| 5,083,723 | 1/1992 | Grieb et al. | 244/1 TD |

OTHER PUBLICATIONS

AGTS–36 Alternative Powerhead Prototype Demonstration Test Report, TMC Document No. 35–1, Nov. 15, 1985.

Primary Examiner—John Q. Nguyen
Attorney, Agent, or Firm—Beveridge, DeGrandi, Weilacher, Young, LLP

[57] ABSTRACT

A turbine head assembly is provided for use with an aerial tow reel assembly. The turbine head includes permanently open aft exhaust ports and a turbine assembly upstream of the exhaust port. The turbine head assembly features a housing with an open inlet. A split balanced butterfly valve assembly is provided at the open inlet of the housing. An actuation assembly drives a pair of baffle doors about a vertical axis with the baffle doors being arranged so as to automatically rotate inward into a closed position whenever there is a power outage in flight. This fail-safe feature avoids turbine overspeeding. The actuation assembly is positioned closer to the inlet and the butterfly valve assembly than to the turbine assembly. This placement of the actuation assembly closer to the inlet allows for the use of a gear assembly with a complimentary torque arrangement which is quick to respond to sensed changes in cable speed by a control system which signals the motor to vary the degree to which the baffle doors allow air to enter the air passageway leading to the turbine blades. The actuation assembly is also placed external to the guiding wall of the air passageway as well as the outer skin of the nacelle housing. A streamlined housing covers the portion of the actuation assembly extending outward from the nacelle's outer skin. The cover and actuation assembly are positioned above the top of the baffle doors. Also, an additional fail-safe feature is provided in the control system to sense levelwind operation failure.

33 Claims, 7 Drawing Sheets

TURBINE HEAD ASSEMBLY WITH INLET VALVE DRIVEN BY A FORWARD POSITIONED ACTUATION ASSEMBLY

FIELD OF THE INVENTION

The present invention relates to a turbine head assembly, particularly adapted for use with a tow reeling machine, for in flight deployment of tow targets. More particularly, the present invention relates to an improved turbine head assembly for a turbine driven tow reeling machine which includes a split butterfly valve system at the inlet and a controlled actuation system.

BACKGROUND DISCUSSION

A variety of tow target reeling machines have been utilized over the years to sharpen the skills of pilots flying in pursuing aircraft. To take advantage of the air stream forces which develop with respect to high speed aircraft, tow reeling machines, such as that disclosed in U.S. Pat. No. 4,770,368 and 4,496,159, use turbine assemblies for the reeling in and reeling out of tow targets. The prior art tow reel machines also rely on control means to control the rate at which the tow target is reeled in or reeled out with respect to the tow reeling machine.

SUMMARY OF THE INVENTION

The present invention features a turbine head assembly for use with a tow reel assembly which has high survivability, low maintenance costs, low operating costs, fast actuation system response time, a reduction in certain control requirements, and low drag.

The present invention features a tow head assembly which has permanently open exhaust openings positioned aft of the turbine assembly and an adjustable valve assembly positioned forward of the turbine assembly and essentially at the inlet of the nacelle for the turbine head assembly. The valve assembly is arranged such that it automatically closes shut any time there is an electrical outage in the system, a sensed problem in the system, or a failure in the actuation system. Thus, the design of the present invention is such that there is provided a highly encompassing fail-safe feature to avoid turbine overspeeds. The valve assembly receives signals from a control system which direct the valve assembly into a position designed to achieve a desired turbine speed. The valve assembly also sends feedback signals to the control system for monitoring the position of the valve assembly. Also, the present invention is dimensioned and arranged for "drop-in" replacement of existing prior art turbine head assemblies and provides easy access for facilitating maintenance.

In the preferred embodiment of the invention, the valve assembly includes a split balanced butterfly valve with two pivoting baffle doors which each rotate at the inlet of the nacelle about a vertical axis. The baffle doors are dimensioned so as to create a greater wetted surface area inward of the vertical rotation axis whereby air impinging on the baffle doors will automatically bias the baffle doors into a closed position. When in a closed position, the baffle doors are preferably arranged such that a majority of each baffle door lies within the confines of the nacelle's inlet while blocking entrance of essentially all air into the nacelle. Also, when the baffle doors are in a closed position, they are arranged so as to diverge in a forward to aft direction so as to reduce drag through a cutting and deflection of the impinging air stream.

The present invention also includes an actuation assembly for varying the position of the valve assembly. The actuation assembly of the present invention provides a fast response time with respect to the opening and closing of the moving components of the valve assembly even when subject to the large forces which develop during high speed flight.

The actuation assembly is in communication with a control system which monitors the reeling in and reeling out speed of the tow cable used with the tow reeling system. The sensed parameters of the control assembly are used to signal the actuation assembly such that the valve assembly can be adjusted accordingly. The fast response time for the actuation assembly and driven valve assembly components of the present invention avoids the need for added electronic compensation circuits.

The fast response of the present invention is achieved, in part, by the placement of the motor and associated driving means for driving the baffle doors of the valve assembly closer to the valve assembly than to the turbine blade assembly. In a preferred embodiment of the present invention, the actuation assembly includes a motor which drives a gear assembly, which, in turn, is in driving engagement with the baffle doors of a split balanced butterfly valve assembly. The gear system utilizes a rotary to rotary assembly with a constant mechanical advantage (e.g., a compensating torque arrangement).

The present invention also features a compensating torque arrangement with respect to the driven and driving gears which rotate the baffle doors into contact with one another along an internal edge. Air impinging on the doors biases the doors in a closed arrangement without the need for an additional locking structure. The arrangement of the actuation assembly and valve assembly also helps to lessen the degree to which the forces of the air stream on the baffle doors are transmitted to the motor (e.g., a servo motor). The preferred arrangement of the present invention is believed to reduce the force of the air stream on the motor such that only 33% of the full force of the air stream is transmitted to the motor.

The placing of the actuation assembly's motor close to the inlet allows for the use of the quickly responding gear assembly of the present invention. The gear assembly of the present invention includes a bevel gear attached to a U-joint assembly extending from the motor's spline and a corresponding bevel gear which drives a vertically arranged shaft. The vertically arranged shaft has one spur gear attached thereto for driving a section gear fixed to a vertical pivot post of a first baffle door. The vertically arranged shaft also includes a second spur gear which drives a complementary spur gear on a parallel but spaced shaft. The parallel shaft supports an additional spur gear which is in contact with a section gear secured to a pivot post of the second baffle door.

In addition to being highly responsive, the actuation assembly of the present invention also is dimensioned and arranged so as to not disrupt air entering the inlet when the baffle doors are opened. The actuation assembly allows for a high volume system that has the air stream simultaneously contacting a plurality of stator blades for a fixed stator assembly having a central axis aligned with the central axis of the nacelle. The advantages of not disrupting the air flow entering the inlet and traveling to the turbine and allowing for a high volume of air flow relative to the nacelle dimensions are made possible by the positioning of the actuation assembly within a cowl hollow formed between the outer skin of the nacelle and the inner guide wall for the air passageway. So that the air passageway is maintained smooth and without disruptions, the external skin of the nacelle has an aperture formed therein. The motor for the actuation assembly extends externally with respect to the external skin of the nacelle and out through the aperture formed therein. To protect the motor and to provide easy maintenance access, an actuation assembly cover encompasses the aperture and extends off the external skin. The cover is designed in a streamline fashion with sloping front and rear surfaces to minimize drag.

Also, the actuation assembly is preferably positioned at a vertically upper and forward portion of the nacelle just behind the inlet rim. This arrangement provides for easy access.

The present invention also features an advantageous turbine blade assembly which, through the use of complimentary stator and rotor blade angles provides an efficient and high powered turbine assembly for its size and required performance characteristics.

The preferred control system of the present invention features a digital controller that monitors the length, direction and speed of cable as it is being reeled out or reeled in. The desired relationship between cable length, direction and speed is under software control in the digital controller. When the speed of the cable is out of tolerance, the digital controller generates a command that results in either an increase or decrease in the speed of the cable to bring it back into tolerance. The digital controller accomplishes this by interfacing with the butterfly valve via the actuator system which uses a linear actuator and its associated driver.

The control system of the present invention also features additional fail-safe features. A tachometer senses the speed of the turbine for the purpose of making sure that turbine overspeeding does not occur. An additional fail-safe feature of the present invention includes a levelwind sensing assembly with sensors positioned so as to ensure rotation of the levelwind shaft. If a stoppage in rotation of the levelwind shaft is sensed, the turbine is quickly stopped to avoid destruction of the turbine system due to overspeeding.

BRIEF DESCRIPTION OF THE DRAWINGS

A better understanding of the invention can be gained from a consideration of the following detailed description of the preferred embodiments thereof, in conjunction with the appended figures of the drawings wherein.

DETAILED DESCRIPTION OF THE EMBODIMENT

Figure 1:
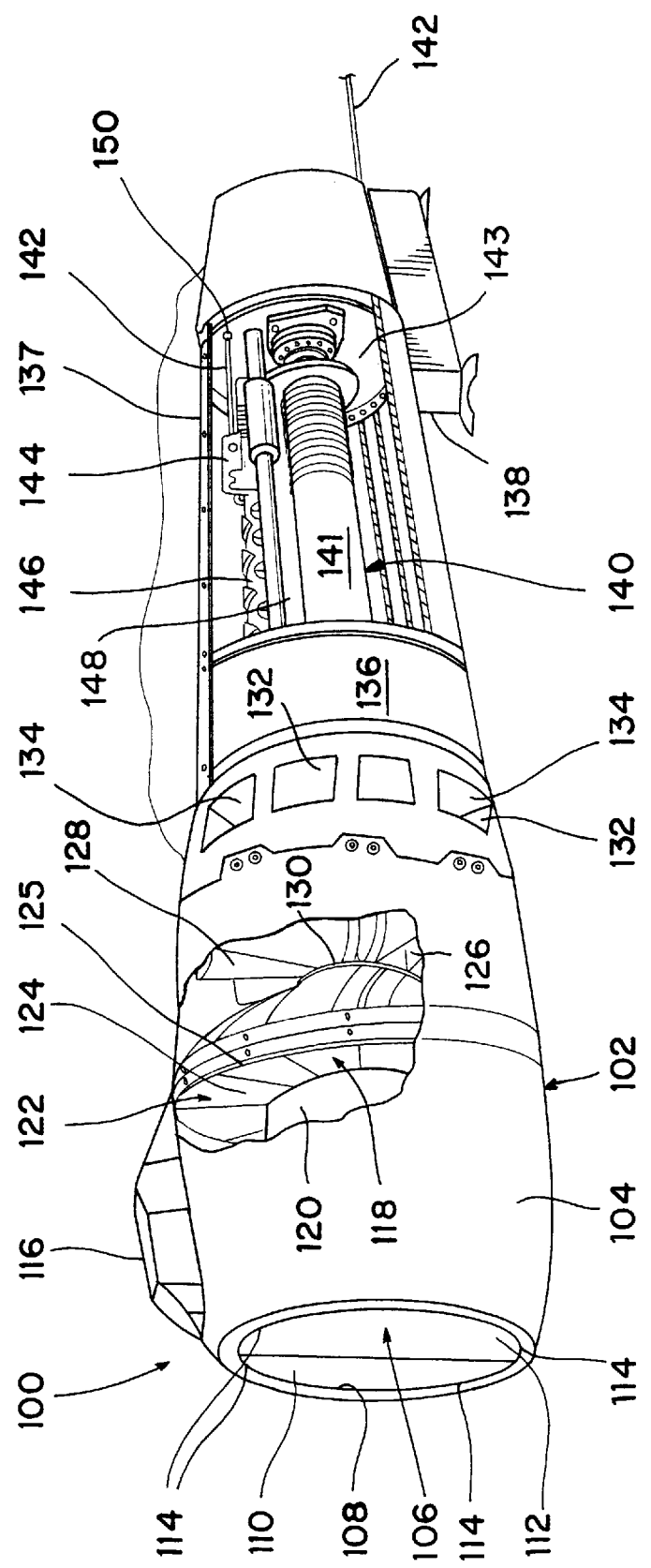
FIG. 1 shows a perspective view of a preferred embodiment of the present invention with portions cut away for clarity.

FIG. 1 illustrates a preferred embodiment of the present invention. As shown in FIG. 1, tow reeling machine 100 includes turbine head assembly 102 with nacelle housing 104 having inlet 108 shown blocked off by split balanced butterfly valve 106. Butterfly valve 106 includes left baffle door 110 and right baffle door 112 with each baffle door being pivotably supported by the housing upon pivot members 114 such that the baffle doors are rotatable about an essentially vertical axis. At the top of housing 104 is positioned stream lined actuation assembly cover 116.

FIG. 1 shows turbine assembly 118 through a cut-away portion of housing 104. Turbine assembly 118 includes hub-fairing 120 about which is fixed stator assembly 122. Stator assembly 122 includes stator blades 124 and an outer rim 125 fixed to the interior surface of housing 104 or integral therewith. Aft of stator assembly 122 is rotor blade assembly 126. Rotor blade assembly 126 includes fixed rotor blades 128 and rotatable rotor hub 130. Further aft of rotor blade assembly 126 is air exhaust guide 134 which directs air exiting from rotor blade assembly 126 through permanently open air exhaust openings 132. A turbine shaft 181 (FIG. 4) is keyed to rotating rotor blade assembly 126 so as to drive the components of transmission housing 136. The tow reeling machine is attached to an aircraft with an attachment device such as attachment device 137 and the tow reeling machine 100 includes a tow target grasping mechanism 138.

Power from the rotating turbine shaft is received by any suitable transmission assembly positioned within transmission housing 136 (e.g., a chain and sprocket combination) and used to rotate diamond groove shaft 146 and rotary spool 141 which forms part of cable spool assembly 140. Cable 142 is wrapped about rotary spool 141 and guided through ball reversing carriage 144 which is supported by guide bar 148. Cable 142 passes through aft bulkhead 143 through cable exit hole 150 and then out through the rear of tow reeling machine 100 to an attachment mechanism of a target (not shown).

Figure 2:
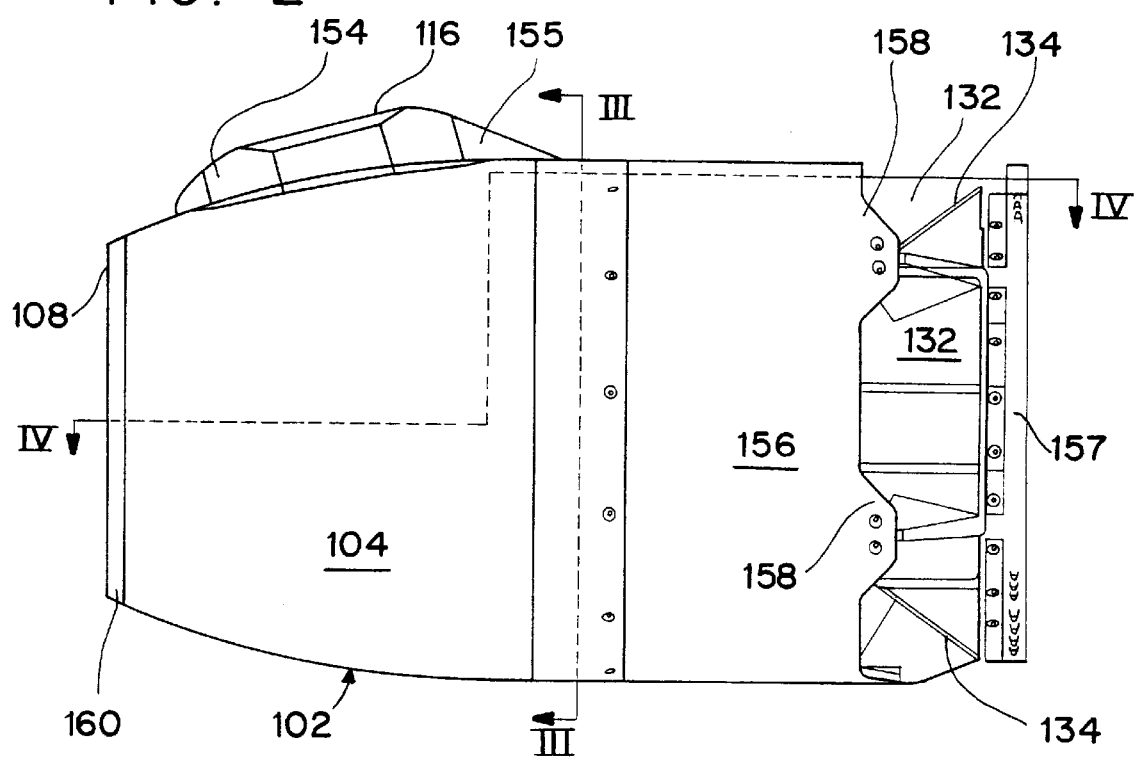
FIG. 2 shows a side elevational view of the turbine head assembly shown in FIG. 1.

FIG. 2 shows a side elevational view of turbine head assembly 102. As shown in FIG. 2, turbine head assembly includes inlet rim 160 defining inlet opening 108. Housing 104 has an upper aperture 161 (FIG. 3) formed therein which is encompassed by stream lined actuator assembly cover 116. Cover 116 includes a gently sloping front portion 154 and an inclined rear portion 155. Cover 116 is attached to housing 104 so as to cover aperture 161 formed in the outer skin of housing 104. FIG. 2 also illustrates stator/rotor housing member 156 having structural tabs 158 at its aft end. Between forward bulkhead 157 and the aft end of stator/rotor housing member 156, a plurality of air exhaust openings 132 are provided. To facilitate air flow through exhaust openings 132, frusto conical air exhaust guide 134 extends forward of bulkhead 157.

Figure 3:
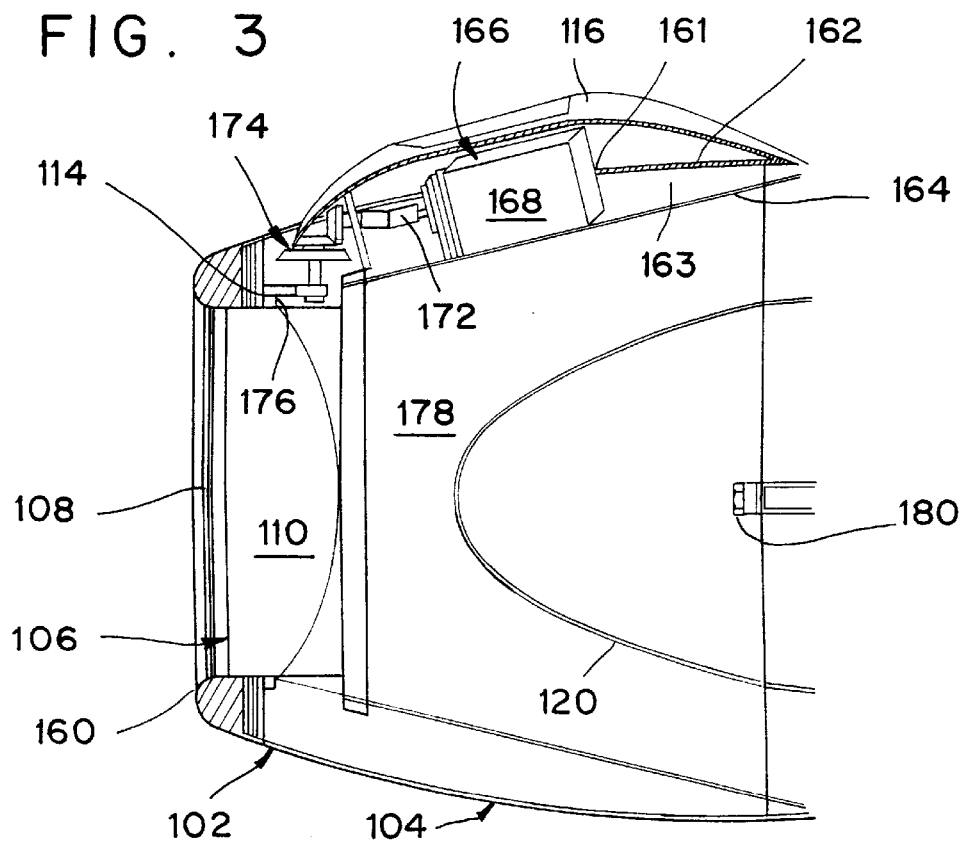
FIG. 3 shows a cross-sectional view taken along view line III—III in FIG. 2.

FIG. 3 provides a cross-sectional view taken in the direction of line III—III in FIG. 2. FIG. 3 illustrates split balanced butterfly valve 106 positioned at inlet 108 of turbine head assembly 102. Split balanced butterfly valve 106 includes baffle door 110 pivotably supported by inlet rim 160 and driven by actuation assembly 166 which includes motor 168, U-joint assembly 172, gear assembly 174 and door drive shaft 176 vertically extending at pivot point 114. Housing 104 includes outer skin 162 and inner guide wall 164 which, together with outer skin 162, forms cowl hollow 163. Motor 168 of the actuator assembly is secured within aperture 161 formed in outer skin 162 and extends inwardly to inner guide wall 164. The aperture in outer skin 162 also allows U-joint assembly 172 to extend outward into contact with gear assembly 174. Motor 168 is completely confined within cowl hollow 163, while U-joint assembly 172 and gear assembly 174 are also retained within cowl hollow 163 with drive shaft 176 extending through the inner guide wall 164 of housing 104.

When split balanced butterfly valve 106 is in an open state, air passes through inlet 108 and through air passageway 178 which is defined by inner guide wall 164 of housing 104 and diverging hub fairing 120.

Figure 4:
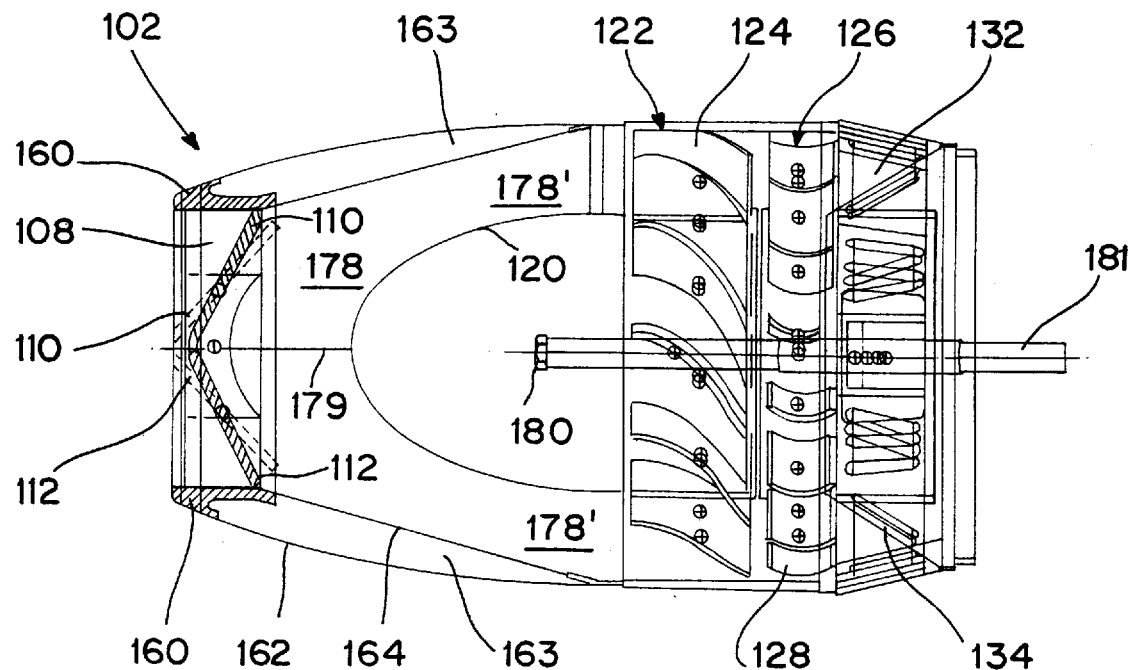
FIG. 4 illustrates a top plan view taken along view line IV—IV in FIG. 2.
Figure 9:
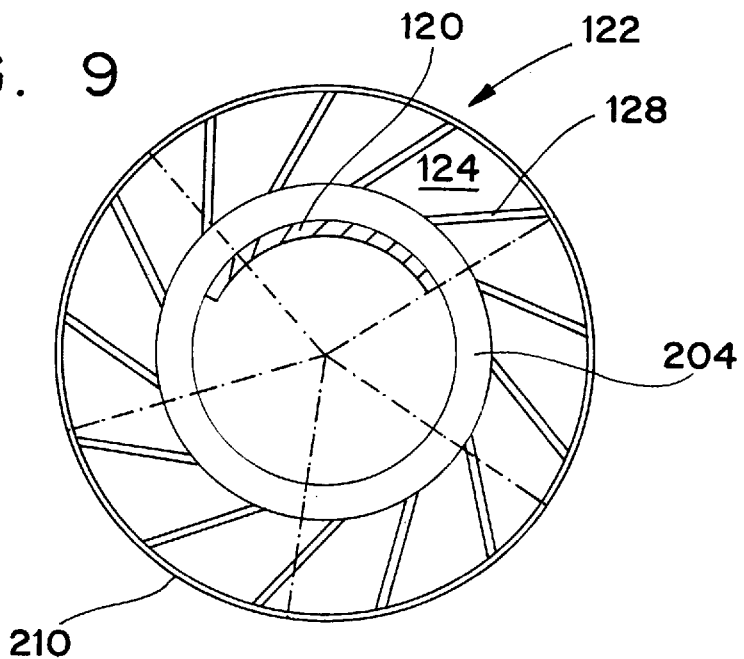
FIG. 9 shows a cross-sectional view of the stator assembly taken along cross section line IX—IX in FIG. 8.

FIG. 4 shows a plan view of turbine head assembly 102 taken along line IV—IV of FIG. 2. FIG. 4 illustrates baffle doors 110 and 112 in a closed position blocking air from flowing through inlet 108 and into air passageway 178. FIG. 4 also shows split balanced butterfly valve 106 with baffle doors 110 and 112 shown in a partially open position by dashed lines. Air passing past baffle doors 110 and 112 passes through air passageway 178 into contact with fixed stator blades 124 of stator assembly 122, past rotor blades 128 of rotor blade assembly 126 and out through exhaust openings 132 while passing along exhaust guide 134. The central hub of the stator and rotor assembly are arranged so as to have a central axis parallel and preferably co-aligned with central axis 179 of housing 106 and inlet 108. Turbine shaft 181 is keyed to the rotating rotor blade assembly and used to drive the reeling assembly. Air passageway 178 features a circumferential ring section 178' lying between hub fairing 120 and the aft end of cowl hollow 163. The circumferential ring section directs air simultaneously into the blades of cylindrical stator assembly 122. The radial height of circumferential ring section 178' extending about hub fairing 120 is at least equal to the radial distance stator blades 124 extend out from hub 204 (FIG. 9).

Actuation assembly 166, in combination with split balanced butterfly valve 106, provides for linear control of air flow passing to the turbine assembly. Also, baffle doors 110 and 112 are dimensioned and arranged such that, upon a power failure of actuation assembly 166, baffle doors 110 and 112 automatically close. This fail-safe feature is achieved by having each baffle door's wetted surface area lying inward of the respective vertical rotation axis greater than the wetted surface of each door lying outward of the respective vertical axis. Thus the air stream impinging on the doors will cause them to rotate towards one another into contact in a shut condition. Actuator assembly 166 is therefore needed to be powered in order to move the doors from their fail-safe closed position to a partially or completely open position when the aircraft is in flight.

Upon a failure of any component in the actuation assembly or an electrical power outage, the baffle doors will automatically shut due to the greater inner wetted surface area of each door. Baffle doors 110 and 112 are also designed with an exterior curvature (see FIG. 5) such that, when the baffle doors are closed, inlet opening 108 is essentially sealed off. This means that the interior of housing 104 (shown in FIG. 3) is essentially at free stream static pressure whenever baffle doors 110 and 112 are in a closed position. This avoids the possibility of overpressurizing of the housing 104 during high speed flight and prevents structural failure (e.g., an explosion) of the housing.

Baffle doors 110 and 112 are each slightly oblique with respect to a vertical plane when in the closed position so as to form a V-shape with the apex of the V positioned forwardmost. This arrangement helps to split the airstream and deflect air so as to reduce drag. Also, actuator assembly cover 116 is formed of an aerodynamic shape so as to further reduce drag with respect to air passing past the turbine head assembly 102. A further advantage of the inlet doors 110 and 112 is that when in a closed state during take off and landing the baffle doors are closed so as to avoid debris ingestion which can damage the turbine head assembly.

Figure 5:
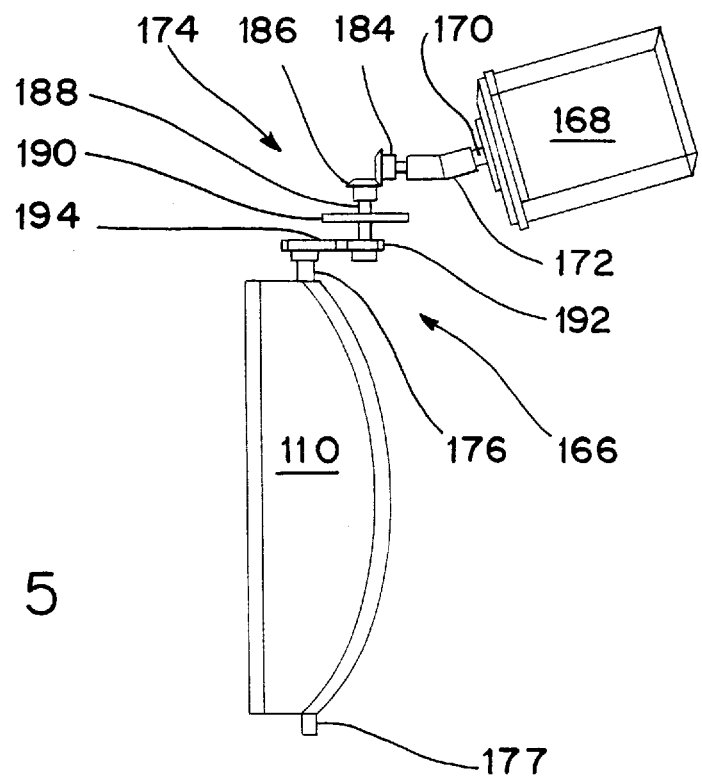
FIG. 5 illustrates a preferred actuation assembly and split balanced butterfly valve assembly removed from the remainder of the tow reel assembly for clarity.

FIG. 5 illustrates a preferred embodiment of actuation assembly 166 removed from housing 104 for clarity and ease in description. FIG. 5 illustrates actuation assembly in a side elevational view. Actuation assembly 166 includes motor 168 which electrically communicates with the control system discussed in greater detail below for driving motor driven shaft 170 in a controlled manner. Motor driven shaft 170 is connected with universal joint assembly 172 which is connected to bevel gear 184 of gear assembly 174. Bevel gear 184 is in driving communication with bevel gear 186. Preferably bevel gears 184 and 186 are in a 1:1 ratio with each having thirty (30) teeth with a P.D. of 0.625. Bevel gear 186 is fixed to cluster gear shaft 188. Larger spur gear 190 and relatively smaller spur gear 192 are also fixed to cluster gear shaft 188. In a preferred embodiment, spur gear 190 includes forty-two (42) teeth with a P.D. ratio of 1.75 and spur gear 192 features twenty-four (24) teeth with a P.D. ratio of 1.00. Section gear 194 communicates with the spur gear 192 such that rotation of cluster gear shaft 188 and attached spur gear 192 results in rotation of door drive shaft 176 which is fixed with respect to baffle door 112. Section gear 194 in a preferred embodiment has a P.D. ratio of 3.00 and 72 teeth.

Baffle door 110 also includes lower pivot post 177 which is pivotably supported by rim section 160 of housing 104. The actuation assembly 166 is arranged such that the total drive ratio is 3:1. Structural supports and bearing surfaces (not shown) can be provided (e.g. about gear shaft 188) to secure gear assembly 174 in position.

Figure 6:
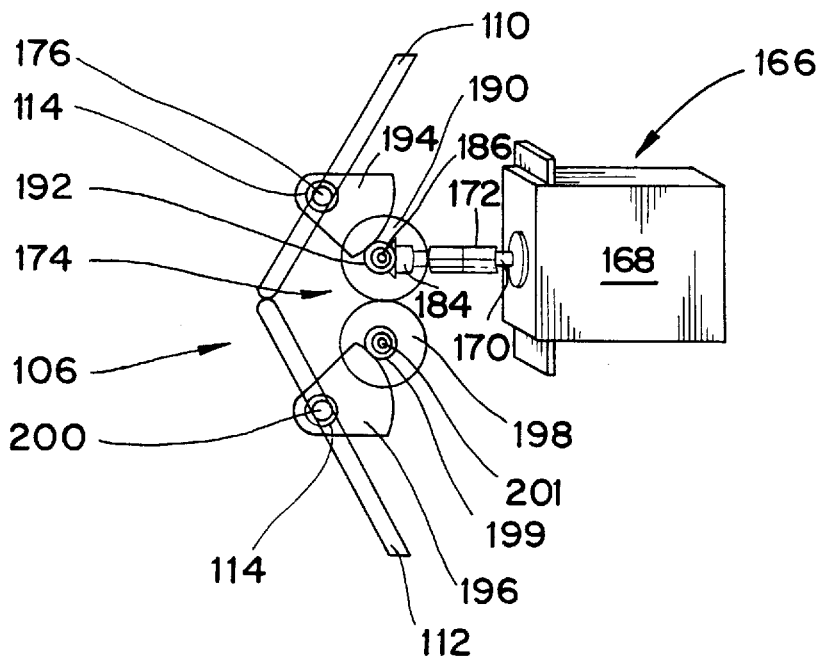
FIG. 6 shows a top plan view of that which is shown in FIG. 5.

FIG. 6 provides a top plan view of actuation assembly 166 and split balanced butterfly valve 106. As shown in FIG. 6, a second large diameter spur gear 198 (having the same configuration as spur gear 190) is in driving communication with spur gear 190. Spur gear 198 is fixed to support shaft 201 which is rotatably supported within cowl hollow 163. Shaft 201 also supports spur gear 199 which is the same as spur gear 192. Spur gear 199 is in driving communication with section gear 196 which is dimensioned the same as section gear 194. Section gear 196 is fixed to door drive shaft 200 such that rotation of section gear 196 causes baffle door 112 to be rotated about pivot points 114.

Figure 7:
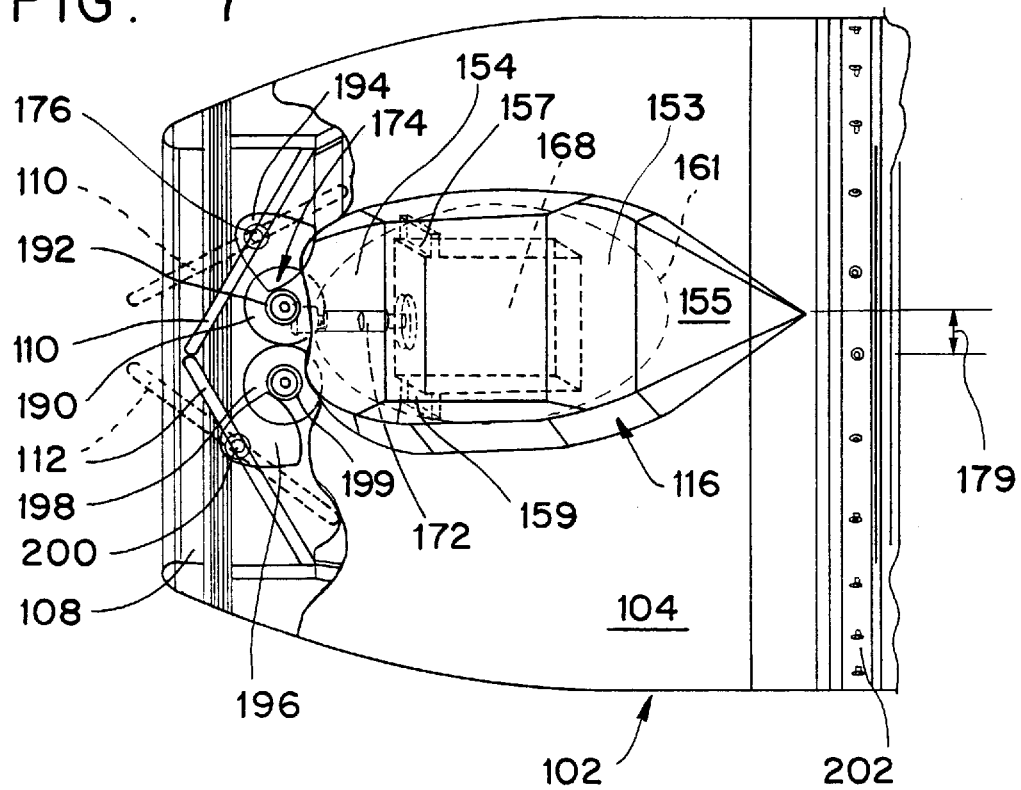
FIG. 7 shows a top plan view of the turbine head portion shown in FIG. 3 with portions cut away.

FIG. 7 shows a partially cut-away top planar view of turbine head assembly 102. Turbine head assembly 102 includes housing 104 with attachment ring 202 at its aft end for securement with stator/rotor housing member 156 (FIG.

10). Mounted on top of housing 104 is aerodynamic actuation assembly cover 116. Aerodynamic actuation assembly cover 116 features converging and sloping front portion 154, planar mid-portion 153 and a sloping and converging rear portion 155. Secured within the interior of cover 116 is motor 168. Mounting brackets 157 and 159 show a preferred manner of securing motor 168 within cover 116 and aperture 161 formed in the outer skin of the housing. U-joint assembly 172 extends out from motor 168 into engagement with gear assembly 174. As described above for FIG. 7, gear assembly 174 acts to rotate baffle doors 110 and 112 to either the closed position shown in solid lines in FIG. 7 or a partially open or completely open position with the partially open position being shown in dashed lines in FIG. 7.

Figure 8:
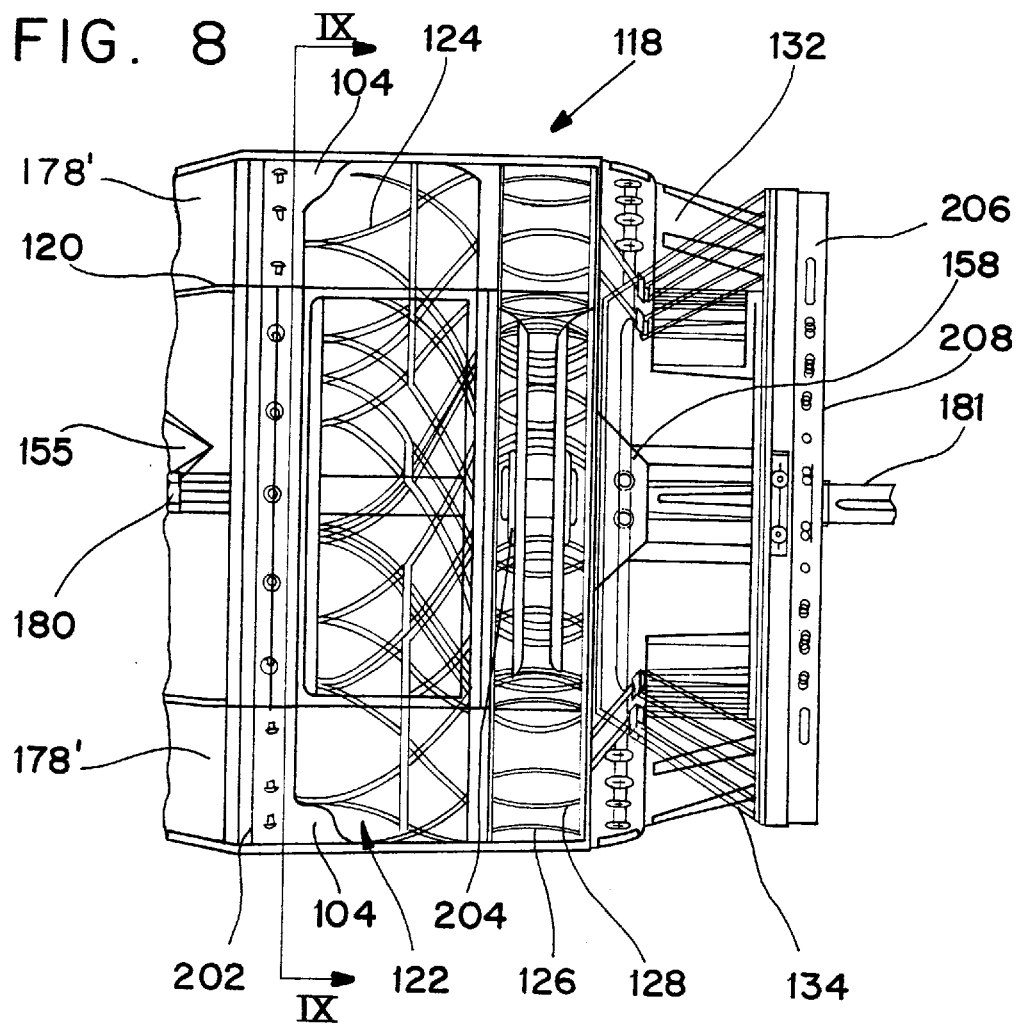
FIG. 8 illustrates a top plan view of that which is shown in FIG. 2 with portions cut away.

FIG. 8 illustrates a side elevational view of turbine assembly 118 with a majority of housing 104 removed so as to clearly view turbine assembly 118. Stator assembly 122 receives air when split balanced valve assembly 106 is partially opened or completely opened. Air travelling through passageway 178 and circumferential section 178' enters the inlet portion of stator assembly 122 simultaneously and is directed by stator blades 124 into contact with fixed rotor blades 128 of rotating rotor blade assembly 126. The air is then ejected from rotor blade assembly 126 along air exhaust guide 134 and out through permanently open exhaust openings 132. The rotating rotor blade assembly 126 is keyed to turbine drive shaft 181 which extends through forward bulkhead 208. Drive shaft 181 includes a front shaft extension 180 which extends forward of rotor blade assembly 126 and includes a socket recess so as to allow for manual rotation upon insertion of a tool between open baffle doors 110 and 112. When motor 168 is not operating and the towing aircraft is not moving, baffle doors 110 and 112 can be easily manually pulled open as the only force which needs to be overcome is the internal friction forces of gear assembly 174 and motor 168.

FIG. 9 illustrates a cross-sectional view taken along cross-section line IX—IX in FIG. 8. As shown in FIG. 9, stator assembly 122 includes an internal hub 204 from which hub fairing 120 (partially shown) extends forward. The stator assembly also includes outer rim 210 concentrically arranged with hub 204 as well as a plurality of stator blades 124 having an inner edge fixed to hub 204 and an outer edge secured to rim 210. Table 1 below shows the preferred ranges and values of a preferred embodiment of the stator blade assembly 122.

TABLE 1

| Stator turning | 57° ± 3° |
| Incidence angle | 0° ± 3° |
| Exit angle | 33° ± 3° |
| Number of Blades | 13 blades |
| Construction | welded blades |

Figure 10:
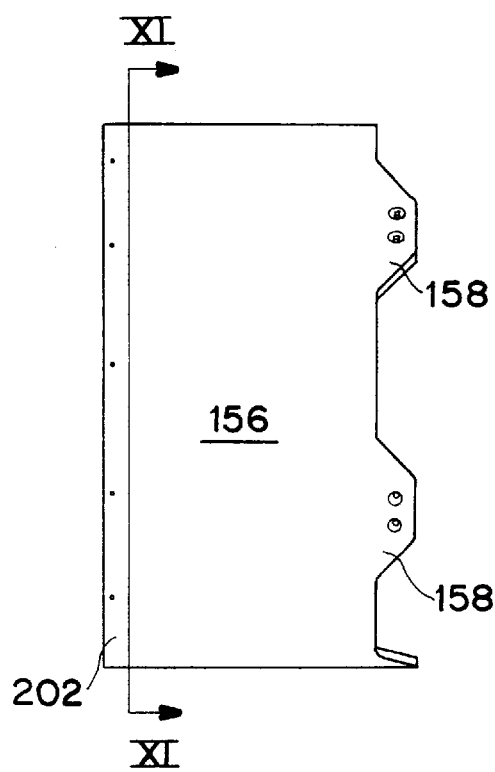
FIG. 10 shows a side elevational view of the turbine blade housing shown in FIG. 2.
Figure 11:
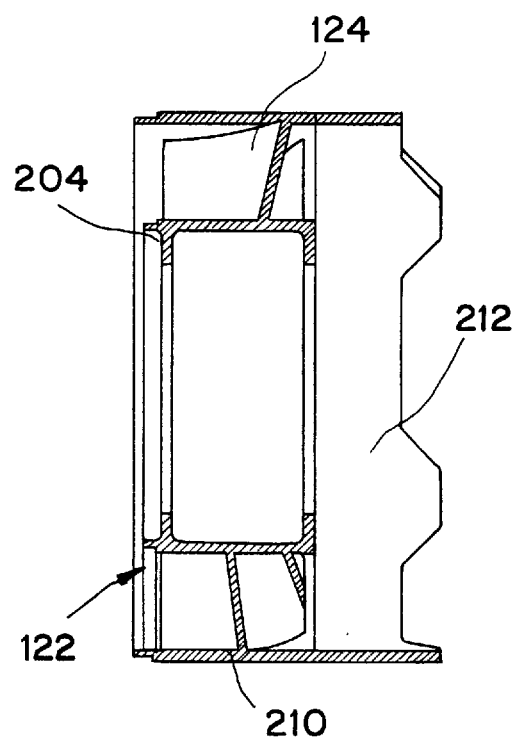
FIG. 11 shows a cross-sectional view taken along XI—XI in FIG. 10.

FIG. 10 illustrates a side elevational view of stator/rotor blade housing 156 with securement tabs 158 serially spaced about the aft circumference of blade housing 156. Front attachment ring 202 is secured to aft attachment ring 206 of housing 104. As shown in FIG. 11, stator/rotor blade housing 156 has an exterior shell with a thickened portion which defines rim 210. Stator assembly 122 further includes curving stator blades 124 and free space 212 forming the aft portion of stator/rotor blade housing 156. Free space 212 provides an area in which rotor assembly 126 is free to rotate without interference with the surrounding blade housing 156.

Figure 12:
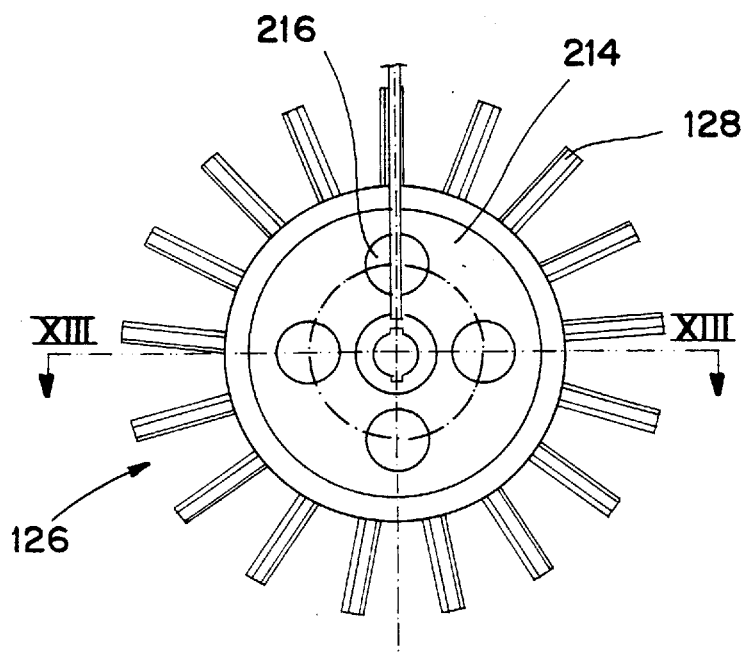
FIG. 12 shows a preferred embodiment of the rotor blade assembly.
Figure 13:
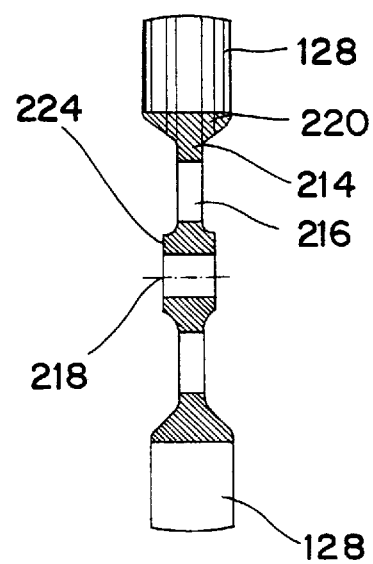
FIG. 13 shows a cross-sectional view taken along cross-section lines XIII—XIII in FIG. 12.

FIG. 12 illustrates a front elevational view of turbine rotor blade assembly 126 with rotor blades 128 fixed to hub disk 214. Hub disk 214 includes a plurality of circumferentially spaced recesses 216 which are positioned radially outward from the center of hub disk 214 which is provided with key shaft opening 218 as shown in FIG. 13. Key shaft opening 218 is formed in central hub 224 and receives shaft 181. Hub disk 214 includes an outer thickened rim portion 220 with a thinner intermediate section 222 extending off from thickened central hub 224. Table 2 below provides some preferred characteristics for rotor performance of the rotor assembly in combination with the previously described stator assembly.

TABLE 2

| Rotor turning | 46° ± 2° |
| Incidence angle | 0° ± 2° |
| Entrance Angle | 44° ± 2° |
| Whirl angle | –9° |
| Mean wheel speed | 123.1 fps |
| Hub diameter | 10.6 inches |
| Tip diameter | 16.9 inches |
| Construction | welded blades |
| Blade construction | tubing |
| Number of blades | 17 |

Figure 14:
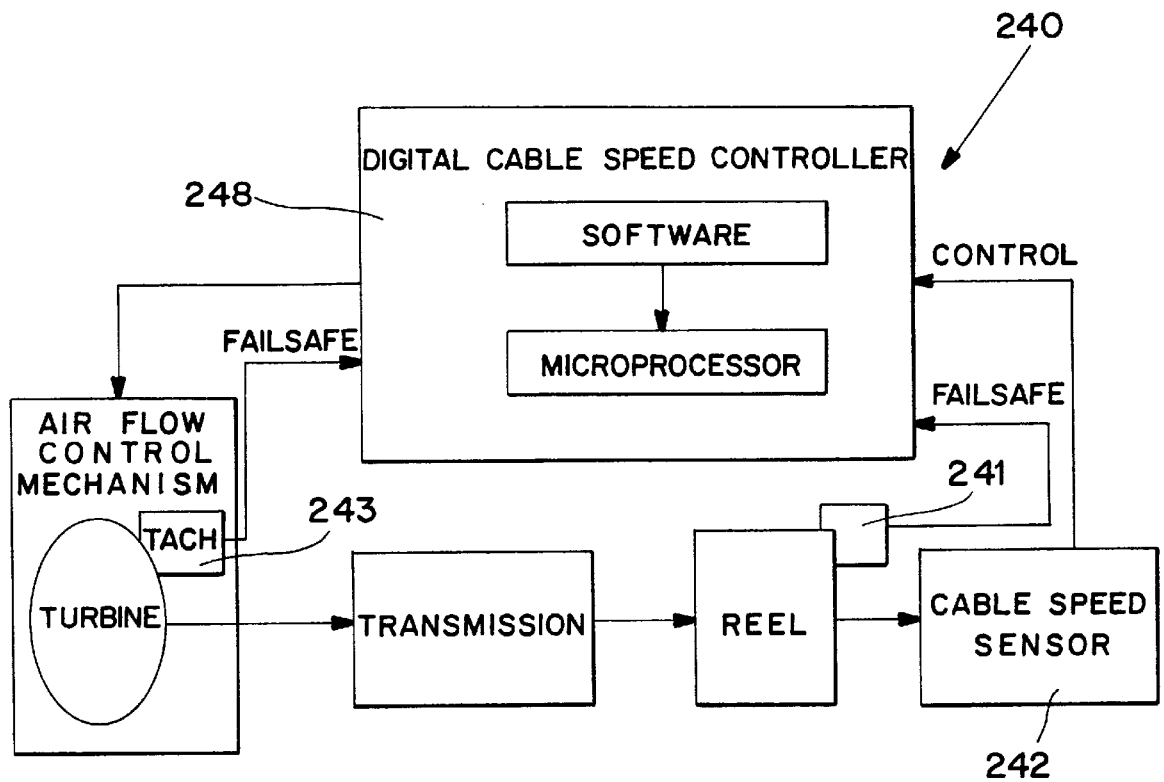
FIG. 14 shows a schematic of the control system of the present invention.

FIG. 14 illustrates a schematic of control system 240 which sends signals to actuation assembly 166 to control the baffle door position to achieve the desired turbine speed and reel in and reel out speed. The control system also receives feedback position signals from sensors monitoring the doors' position. Control system 240 includes the features disclosed in U.S. Pat. No. 5,083,723 to Grieb et al., the contents of which are incorporated herein by reference. The control system as schematically illustrated represents an improvement over that which is disclosed in U.S. Pat. No. 5,083,723 in that a levelwind fail-safe system 241 is provided.

In the prior art systems if the levelwind system failed (e.g., a chain break in the driving chain for the diamond groove shaft) and the cable was not reeled on the spool evenly, then the cable would wind onto the spool shaft at a single location until it contacted a non-moving object and jammed. The jamming of the spool shaft with wound cable can cause chain breakage in the spool shaft driving means. The sudden shift from full load to no load on the turbine can result in overspeeding of the turbine. A failure of this sort could thus lead to a jammed cable dangling from the towing aircraft, a broken levelwind and associated driving means, a broken spool shaft and associated driving means and a destroyed turbine assembly.

Figure 15:
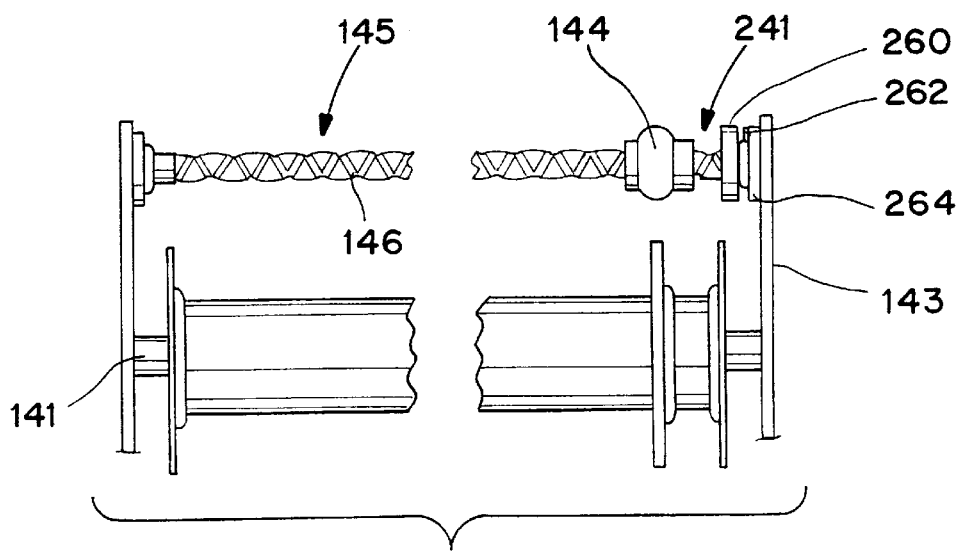
FIG. 15 shows the fail-safe levelwind sensor system of the present invention.

The present invention provides a solution to this problem through the use of levelwind sensor system 241 for providing an added fail-safe feature. As shown in FIG. 14, fail-safe levelwind sensor system is in communication with digital cable speed controller 248. FIG. 15 illustrates system 241 in position with respect to levelwind system 145. Levelwind sensor system 241 includes a ferromagnetic collar 260 placed at the aft end of diamond groove shaft 146. Collar 260 therefore rotates with shaft 146. A pair of magnetic sensors 262 and 264 are fastened to bulkhead 143. If shaft 146 stops rotating due to a failure in the levelwind system, sensors 262 and 264 detect a discontinuation in the rotation of shaft 146 and signal digital cable speed controller 248 of the stoppage. This signal is processed by the digital cable speed controller and the controller then activates the actuation system to close baffle doors 110 and 112. Levelwind sensor system 241 thus represents an additional sensor system to that of cable speed sensor 242 and fail-safe tachometer sensor 243 described in U.S. Pat. No. 5,083,723.

As a further back-up fail-safe system, tachometer sensor 243 is provided with the control system. Also, the positioning of the baffle doors can be monitored by monitoring the rotational position of the drive shaft of the motor and feedback signals based on the rotational position of the motor can be relayed to the control microprocessor.

OPERATION

The operation of the present invention will now be described. A visual augmenter such as that described in U.S. Pat. No. 5,026,073 (which is also incorporated herein by reference) with towed forebody is attached to target grasping mechanism 138 prior to take off of the towing airplane. At this point, the cable is completely wound onto rotary spool 141 with the end of cable 142 secured to the forebody of the target. The butterfly baffle doors are placed in a closed position either through operation of motor 168 or by deactivation of the motor and reliance upon the airstream which develops during take-off.

Over the target area, the forebody and visual augmenter are released such as in the manner disclosed in U.S. Pat. No. 5,026,073 and the drag on the target and expanding visual augmenter causes the cable to start unwinding from cable spool 141. In accordance with the control system described in FIG. 14 and U.S. Pat. No. 5,083,723, the baffle doors are partially opened to slow down the reeling out of the target. The monitoring of the cable speed is relied upon through use of the control system of FIG. 14 so as to match the reeling out of the cable with a predetermined velocity profile. Based on this comparison, the control means alters the position of the baffle doors to maintain a desired reel out speed of the cable and attached target.

Following target practice, the pilot of the towing airplane signals the tow reeling machine to begin reeling in the tow target. The reeling in of the tow target is also conducted in a manner which corresponds with a previously determined velocity profile. The control means controls the output of motor 168 so as to place the baffle doors in a sufficiently open position (i.e., a more open position than that for the braking of the cable during reel out) such that the cable is reeled in as opposed to being reeled out. At any time when the baffle doors are open, the air stream passes through the stator blades, past the rotor blades and out through the permanently opened exhaust ports 132. As described in U.S. Pat. No. 5,102,145, which is incorporated herein by reference, with a target assembly that includes a solid forebody and a knitted visual augmenter, the more expensive forebody assembly is reeled into attachment with the towing aircraft and the visual augmenter and suspension lines are then released. With the towed member grasped by grasping mechanism 138, the pilot is then able to safely land the aircraft.

If at any time, the sensors, control mechanism or actuating motor and accompanying gear assemblies become non-operational or if there is an electrical outage, the baffle doors will either shut automatically due to the higher wetting surface being inward of the pivot points 114 or, alternatively, if it is a sensor or portion of the control means which is defective, a closing signal can be forwarded to the actuating motor 168. The automatic closure of the baffle doors avoids turbine overspeeds. When the target is not deployed and the brake is in position the doors will automatically shut to prevent the airstream from reaching the turbine assembly. A loss of electrical power to the motor will result in the baffle doors automatically closing so as to place the system in a safe mode. The sensors 262 and 264 of levelwind fail-safe system 241 will also trigger a shutdown (i.e., closing of baffle doors and subsequent application of the turbine brake) of the turbine if it is sensed that there is a cable jam or other defect in the levelwind system.

What is claimed is:

1. A turbine head assembly, comprising:
    a nacelle housing having an open inlet end, an internal air passageway, an aft end and an exhaust passageway at said aft end and in communication with said air passageway;
    a turbine assembly including a stator assembly and a rotor assembly, and said turbine assembly being positioned upstream of said exhaust passageway and within said air passageway;
    a butterfly valve assembly positioned at the inlet of said nacelle housing and upstream from said turbine assembly, said butterfly valve assembly including a pair of baffle doors moveable between a closed position and an open position; and
    an actuation assembly for moving said baffle doors between said open and closed positions, said actuation assembly including a motor positioned closer to said butterfly valve assembly than to said turbine assembly.

2. A turbine head assembly as recited in claim 1, wherein said actuation assembly, in entirety, is positioned out of said air passageway and upstream of said turbine assembly, and essentially at the inlet end of said nacelle housing.

3. A turbine head assembly as recited in claim 1, wherein said turbine assembly includes a turbine shaft rotated by said rotor assembly, and said apparatus further comprising a cable reel assembly for reeling in and out tow target cable with said cable reel assembly being driven by said turbine shaft, and means for attaching said nacelle housing to a towing aircraft, and said turbine head assembly comprising a plurality of exhaust passageways which are uncovered, permanently open passageways.

4. A turbine head assembly as recited in claim 3, wherein said cable reel assembly includes a cable spool and a levelwind assembly for winding cable on said cable spool in a single layer back and forth repeating sequence, and said apparatus further comprising monitoring means for directly monitoring performance parameters of said levelwind assembly and means for signalling said actuation assembly to close said baffle doors upon a sensing by said monitoring means of a disruption in said levelwind system.

5. A turbine head assembly as recited in claim 4 further comprising a tachometer sensor which monitors turbine speed and upon sensing turbine overspeed issues a fail-safe signal which activates said actuation assembly to close said baffle doors.

6. A turbine head assembly as recited in claim 4 further comprising a cable reel assembly housing encompassing said cable reel assembly, an aircraft attachment device secured to said cable reel assembly housing and a tow target grasping mechanism supported by said cable reel assembly housing.

7. A turbine head assembly as recited in claim 1, wherein said nacelle housing includes an external skin and an internal wall with a hollow portion formed therebetween, and said motor being positioned within the hollow portion and external to the air passageway.

8. A turbine head assembly as recited in claim 7, wherein said external skin includes an aperture opening into said hollow portion, and said apparatus further comprising a cover extending off from said housing and covering and closing the aperture, and said motor extending out of said hollow portion and into a chamber formed by said cover.

9. A turbine head assembly as recited in claim 1, wherein said stator assembly is fixed with respect to said nacelle housing and includes a stator hub with a central axis essentially aligned with a central axis of said air passageway, and said actuation assembly is positioned within a hollow formed in said nacelle housing at essentially said inlet end with said hollow portion being provided in an upper region of said nacelle housing.

10. A turbine head assembly as recited in claim 1, wherein each of said baffle doors includes a first edge and the first edges of said baffle doors are in abutment when said baffle doors are in said closed position, and said pivot members are positioned and said baffle doors dimensioned such that said baffle doors are biased into a fail-safe, closed position upon air impinging upon said baffle doors and said actuation assembly being in a non-actuating mode.

11. A turbine head assembly as recited in claim 1, wherein said baffle doors are supported by pivot members at the inlet end of said housing and dimensioned so as to be biased into a closed position upon air impinging on said baffle doors, and said pair of doors abut each other in the closed position and are dimensioned so as to essentially seal off the inlet end of said nacelle housing when in the closed position.

12. A turbine head assembly as recited in claim 1, wherein said actuation assembly includes a gear and rotating shaft assembly driven by said motor and transmitting a driving force to said baffle doors.

13. A turbine head assembly as recited in claim 1, wherein said actuation assembly includes a first gear assembly that is in driving contact with a first of said baffle doors and a second gear assembly that is in driving contact with a second of said baffle doors, and said first gear assembly is driven by said motor and drives said second gear assembly.

14. A turbine head assembly as recited in claim 1, wherein each of said baffle doors include a first edge and a second edge, and said first edges are in an abutting relationship when said baffle doors are in said closed position, and said second edges are configured to conform and seal off a rim member of the inlet end of said nacelle housing when said baffle doors are in said closed position, and said baffle doors being in a non-planar arrangement with respect to each other when in said closed position such that said baffle doors assume a V-shaped arrangement for contacting and deflecting in rushing air.

15. A turbine head assembly as recited in claim 1, wherein said stator assembly is fixed and has stator blades having an angle of attack of about 57° and said rotor assembly has rotor blades having an angle of attack of about 44°.

16. A turbine head assembly as recited in claim 1, wherein said baffle doors includes a first and a second pivot post mounted within a receiving recess formed in an inlet rim of said nacelle housing and said first pivot posts including a gear for driving engagement with said actuation assembly which is positioned between said inlet end and said turbine assembly.

17. A turbine head assembly as recited in claim 1, wherein said baffle doors are supported by support means provided at the inlet end of said nacelle housing and said baffle doors are supported by said support means so as to each pivot about a respective pivot axis between the open and closed positions, and when said baffle doors are in the closed position at least a portion of each baffle door extends inwardly into said nacelle housing so as to be circumferentially surrounded by said nacelle housing and another portion extends outwardly away from said inlet end so as not to be circumferentially surrounded by said housing.

18. A turbine head assembly as recited in claim 1, wherein said nacelle housing includes an external shell which shell includes an aperture formed in said external shell so as to open into an internal hollow formed between said external shell and an inner wall of said nacelle housing partially defining said internal air passageway, and wherein said apparatus further comprises an actuation assembly cover positioned over and covering the aperture formed in said external shell, and said actuation assembly extending at least partially within an interior portion of a space defined by said cover.

19. A turbine head assembly as recited in claim 18, wherein said cover includes a sloping front face to reduce drag with respect to impinging air.

20. A turbine head assembly as recited in claim 1, wherein said baffle doors are pivotably supported by said nacelle housing and include pivot posts, and said actuation assembly including a gear assembly having section gears supported on respective pivot posts, said section gears being in driving contact with a pair of meshed spur gears, with a first of said spur gears being driven by said motor and the other spur gear being driven by said first spur gear, and said spur gears being positioned within a hollow portion of said nacelle housing which is internal to an exterior skin of said nacelle housing and external to an outer air passageway of said nacelle housing.

21. A turbine head assembly as recited in claim 1, wherein said baffle doors are pivotably supported by pivot members supported by said nacelle housing and said actuation assembly includes means for rotating said baffle doors, and said means for rotating said baffle doors includes a pair of intermeshed gears which are in a complimentary torque gear arrangement wherein each gear in said pair rotates in an opposite direction.

22. A turbine head assembly as recited in claim 1, wherein said actuation assembly is supported by said nacelle housing so as to be free from contact with any and all air passing through the internal air passageway.

23. A turbine head assembly as recited in claim 22, wherein said rotor assembly rotates about a pivot axis that extends through said inlet.

24. A turbine head assembly as recited in claim 1, further comprising a cable reel assembly in driving communication with said rotor assembly and a levelwind assembly for evenly directly cable to and from a spool of said cable reel assembly, said levelwind assembly including a support shaft and a carriage adapted to reciprocate from one end to another of said support shaft, and said apparatus further comprising sensor means for directly monitoring cable winding in said levelwind assembly for any cable winding disruptions.

25. A turbine head assembly as recited in claim 1, wherein said baffle doors are pivotably supported by pivot members positioned at the inlet end of said nacelle housing, and said pivot members being positioned such that a portion of each of said baffle doors extends further aft into said inlet when said baffle doors pivot into the open position than when said baffle doors pivot into the closed position, and, when said baffle doors are in the closed position, said baffle doors are arranged in a V-shape and said pair of baffle doors essentially closes off the inlet end of said nacelle housing.

26. A turbine head assembly, comprising:
 a nacelle housing having an open inlet end, an aft end and an internal air passageway extending therebetween;
 a turbine assembly positioned within said nacelle housing and in line with said air passageway;
 a valve assembly positioned at said open inlet, said valve assembly being moveable between a closed position wherein said valve assembly essentially precludes air flow to said turbine to an open position wherein said valve assembly allows air to pass through said inlet and into contact with said turbine assembly;

an actuation assembly for moving said valve assembly between the open and the closed positions, said actuation assembly being in driving engagement with said valve assembly, and said actuation assembly being positioned upstream of said turbine assembly;

and said nacelle housing having a hollow portion formed at an inlet end of said nacelle housing between an external skin and an inner air passageway defining wall of said nacelle housing and within which hollow portion is positioned said actuation assembly.

27. A turbine head assembly as recited in claim 26, wherein said actuation assembly includes a motor and gear assembly driven by said motor and in driving engagement with said valve assembly, said motor and said gear assembly being positioned within said hollow portion so as to be completely free from contact with air travelling through said internal air passageway.

28. A turbine head assembly as recited in claim 26, wherein said actuation assembly includes a motor that is positioned at an upper section of the inlet end of said nacelle housing and said valve assembly includes a pair of butterfly baffle doors each rotatably supported on a rim provided at the inlet of said nacelle housing, and said actuation assembly being positioned out of the air passageway and within a hollow interior partially defined by an external skin of said nacelle housing and partially defined by an inner wall of said nacelle housing defining the internal air passageway such that said actuation assembly is not in contact with air passing in said internal passageway.

29. A turbine head assembly as recited in claim 26, wherein said turbine assembly includes a shaft supported by said housing and a rotor assembly supported by said shaft with the shaft having a pivot axis that extends through the inlet defined by said housing.

30. A turbine head assembly as recited in claim 26, further comprising a cover member extending off of said nacelle housing, said cover member having a hollow interior within which at least a portion of said actuation assembly is received, and said cover member includes an inclined forward surface for reducing drag.

31. A turbine head assembly, comprising:

a nacelle housing having an open inlet, an aft end and an internal air passageway extending from said open inlet;

a turbine assembly positioned within said nacelle housing and in line with said air passageway;

a butterfly valve assembly positioned at said open inlet, said butterfly valve assembly including a pair of baffle doors moveable between a closed position wherein said butterfly valve assembly essentially precludes air flow to said turbine and an open position wherein said valve assembly allows air to pass through said inlet and into contact with said turbine assembly;

an actuation assembly which is in driving engagement with said baffle doors for moving said baffle doors between the open and the closed positions, said baffle doors being pivotably supported on pivot members provided at the inlet end of said nacelle housing so as to each rotate about a respective pivot axis, and wherein said baffle doors are dimensioned and said pivot members are positioned such that said baffle doors are biased into a closed position upon air impinging upon said baffle doors and said actuation assembly being in a non-actuation mode, and wherein said actuation assembly comprises a motor and a driving assembly driven by said motor and in driving contact with said baffle doors, and said motor and driving assembly being supported by said nacelle housing closer to said baffle doors than to said turbine assembly and peripherally external to an inner wall of said nacelle defining the air passageway.

32. A turbine head assembly as recited in claim 31 wherein said turbine assembly includes a turbine shaft supported by said housing and a rotor attached to said turbine shaft, and said apparatus further comprising a cable reel assembly secured to the aft end of said nacelle housing and driven by said turbine shaft.

33. A turbine head assembly as recited in claim 31 wherein said pair of baffle doors are dimensioned and arranged so as to form a V-shaped wedge and to seal off the inlet when in the closed position with the wedge acting to deflect in rushing air.

* * * * *